United States Patent [19]
O'Neill et al.

[11] Patent Number: 5,621,906
[45] Date of Patent: Apr. 15, 1997

[54] PERSPECTIVE-BASED INTERFACE USING AN EXTENDED MASTHEAD

[75] Inventors: Rory O'Neill; Eden G. Muir, both of New York, N.Y.

[73] Assignee: The Trustees of Columbia University in the City of New York, New York, N.Y.

[21] Appl. No.: 388,553

[22] Filed: Feb. 13, 1995

[51] Int. Cl.⁶ .................................................. G06F 3/00
[52] U.S. Cl. ................................. 395/355; 395/349
[58] Field of Search .................................. 395/154–161, 395/119–127, 138–139, 128; 345/117–120, 127–131, 121, 146, 902, 125

[56] References Cited

U.S. PATENT DOCUMENTS

| | | | |
|---|---|---|---|
| 5,295,243 | 3/1994 | Robertson et al. | 395/160 |
| 5,303,388 | 4/1994 | Kreitman et al. | 395/159 |
| 5,339,390 | 8/1994 | Robertson et al. | 395/157 |
| 5,499,330 | 3/1996 | Lucas et al. | 395/155 X |
| 5,515,486 | 5/1996 | Amro et al. | 395/119 |
| 5,528,735 | 6/1996 | Strasnick | 395/127 |

OTHER PUBLICATIONS

Foley et al, "Computer Graphics: Principles and Practice", 2nd ed., 1990, pp. 230–233.

*Primary Examiner*—Mark R. Powell
*Assistant Examiner*—John E. Breene
*Attorney, Agent, or Firm*—Brumbaugh, Graves, Donohue & Raymond

[57] ABSTRACT

Display surfaces such as catalog items, for example, are displayed in one-dimensional order in a corridor perspective which may be based on one or more points. An input-initiated, processor-controlled dollying effect facilitates visual access, navigation, and browsing to the display surfaces. Within a surface, an input-initiated panning option can be provided, and the scale at which a surface is displayed can be changed. Input may be via a mouse, a light pen, a touch-sensitive screen, a keyboard, a track ball, a touch pad, or voice-activated control.

14 Claims, 6 Drawing Sheets

```
JP 6077205  A    940318  9416  JP 92226876  920826         4 H01L-021/306   (B)

Priority Data (CC No Date): JP 92226876 (920826)
Abstract (Basic): JP 06077205 A
                  Dwg. 1/2
File Segment: CPI; EPI
Derwent Class: L03; U11;
Int Pat Class: H01L-021/306; H01S-003/18
Manual Codes (CPI/A-N): L04-A02; L04-C06; L04-C07C
Manual Codes (EPI/S-X): U11-C07B; U11-C07C4A; U11-C07D1

2/9/2
DIALOG(R) File 351: DERWENT WPI
(c) 1994 Derwent Info Ltd. All rts. reserv.

0097743876 WPI Acc No: 94-023727/03
XRAM Acc No: C94-011182
XRPX Acc No: N94-018388
     Prepn. of monocrystalline gallium-arsenic plates liq. phase epitaxial
```

FIG. 1   PRIOR ART

PERSPECTIVE-BASED INTERFACE USING AN EXTENDED MASTHEAD

FIELD OF THE INVENTION

The present invention is directed to a user interface for a computer and, more particularly, to a user interface that arranges information on surfaces placed in a perspective row arrangement.

BACKGROUND OF THE INVENTION

Graphical user interfaces have become an increasingly common feature of computers, and in particular of personal computers. User interfaces may allow a user to access stored or retrieved information in various ways.

One method is to provide, on request, a list of all the topics or files available for use. These topics or files may be listed in a certain order, e.g., alphabetical order. The user can then select which topic or file the user desires to access. Another method is to provide a list of topics or files that meet the requirements of the user. The user can then browse through each topic or file.

However, both methods suffer from the same drawbacks. Most programs tend to display the stored or retrieved information in a "linear" manner, as shown in FIG. 1. In other words, all the retrieved information is scrolled. In these arrangements, the speed at which a user can review data is limited because the scrolling speed reaches a point at which the text blurs and the user cannot read the text as it passes by. On the other hand, if the scrolling speed is too slow, it will be time consuming to browse each piece of information. Finally, most programs do not allow the user to control the scrolling speed.

Another problem with the linear approach is that the user is unable to maintain an awareness of his or her location within the database. Additionally, the user must then revert to "find functions" and deductive thinking to find a specific piece of information.

These problems were partially addressed with graphical user interfaces such as the Windows program by Microsoft Corporation. FIG. 2 shows a two-dimensional card file where each card 20 has desired information. Each card has a masthead 21 that provides some information as to the content of the card. The user can only browse the contents of the card if he or she clicks on the desired card. However, if too many cards exist in the file, the user will only see the cards shown. Thus, the user must then revert to "find functions" and deductive thinking to find a specific piece of information.

Additionally, because the user cannot browse through the cards not shown without inputing several commands or repetitively pressing switches on the mouse, the user may be apt to suffer of repetitive strain injury.

As shown in FIG. 2, the user can only read the contents of the fore card since the other cards are completely covered, except for the masthead 21. This forces the user to browse the information on the cards one card at a time, making browsing each piece of information a time consuming process.

Additionally, the size of the cards and the font size of the contents are not adjustable. Therefore, a visually impaired user may not be able to read the contents of the card.

Finally, for all these methods, a user will be required to input keyboard-based commands. However, a handicapped person with only partial movement or an arthritic person may not be able to type the required commands on the keyboard.

It is thus an object of the invention to provide a graphical user interface that portrays the desired information in a non-linear manner to better enable the user to retain the information.

It is also an object of the invention to provide a graphical user interface where the user can control the scrolling, or passing, speed of the information.

It is a further object of the invention to provide a graphical user interface that enables the user to better maintain an awareness of his or her location within the database.

It is also an object of the invention to provide a graphical user interface that enables the user to quickly find the desired piece of information.

It is a further object of the invention to provide a graphical user interface that does not require repetitive pressures on a keyboard or mouse to find the desired piece of information.

It is also an object of the invention to provide a graphical user interface that enables the user to adjust the size of the displayed information.

It is a further object to the invention to provide a graphical user interface that does not require the user to type commands on a keyboard.

SUMMARY OF THE INVENTION

The objects of the invention are met by a graphical user interface for a computer system comprising a plurality of information surfaces displayed in a perspective row arrangement, wherein a user can access any surface by moving within the row via the input means of the computer system. The user may also access the information on any surface by moving within the surface via the input means. The input means may be a mouse, a light pen, a touch sensitive screen, a keyboard, a track-ball, a touch pad, or voice activated control.

A perspective row arrangement of surfaces is an arrangement where the surfaces face the user arranged in a row, as in a card catalog. Additionally, the surfaces are shown and recede in perspective. Thus, the "farthest" surface will be smaller than the surface "closest" to the user. The perspective of the arrangement of surfaces may be based on one or more points. For example, the arrangement may be a one-point perspective row arrangement, where the perspective of the surfaces is based on one point, as in FIG. 4. The arrangement may also be a multiple-point perspective arrangement, where the perspective of the surfaces is based on multiple points, as in FIG. 6.

A perspective algorithm is used to control the relative sizes of multiple information surfaces on a screen, as well as to control the size of the fonts on each surface. The interface functions as a visual data compression mechanism by representing the information surfaces which are "closest" to the user as being larger and more detailed than the surfaces which are in the background.

BRIEF DESCRIPTION OF THE DRAWINGS

Now the present invention will be described in detail hereinafter with reference to the accompanied drawings which illustrate different embodiments of the present invention, wherein:

FIG. 1 illustrates a prior art user interface;

DETAILED DESCRIPTION

Figure 2:
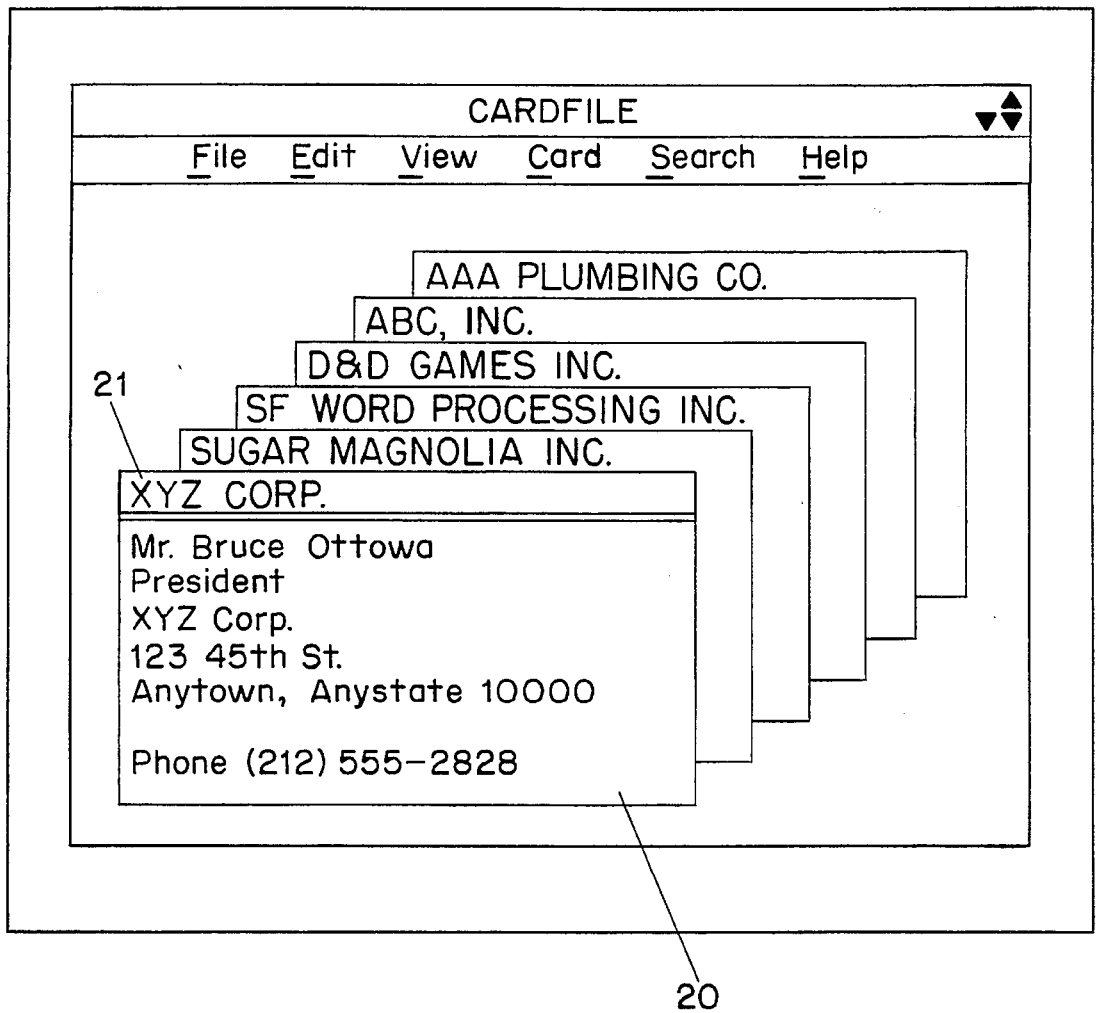
FIG. 2 illustrates a prior art graphical user interface.
Figure 3:
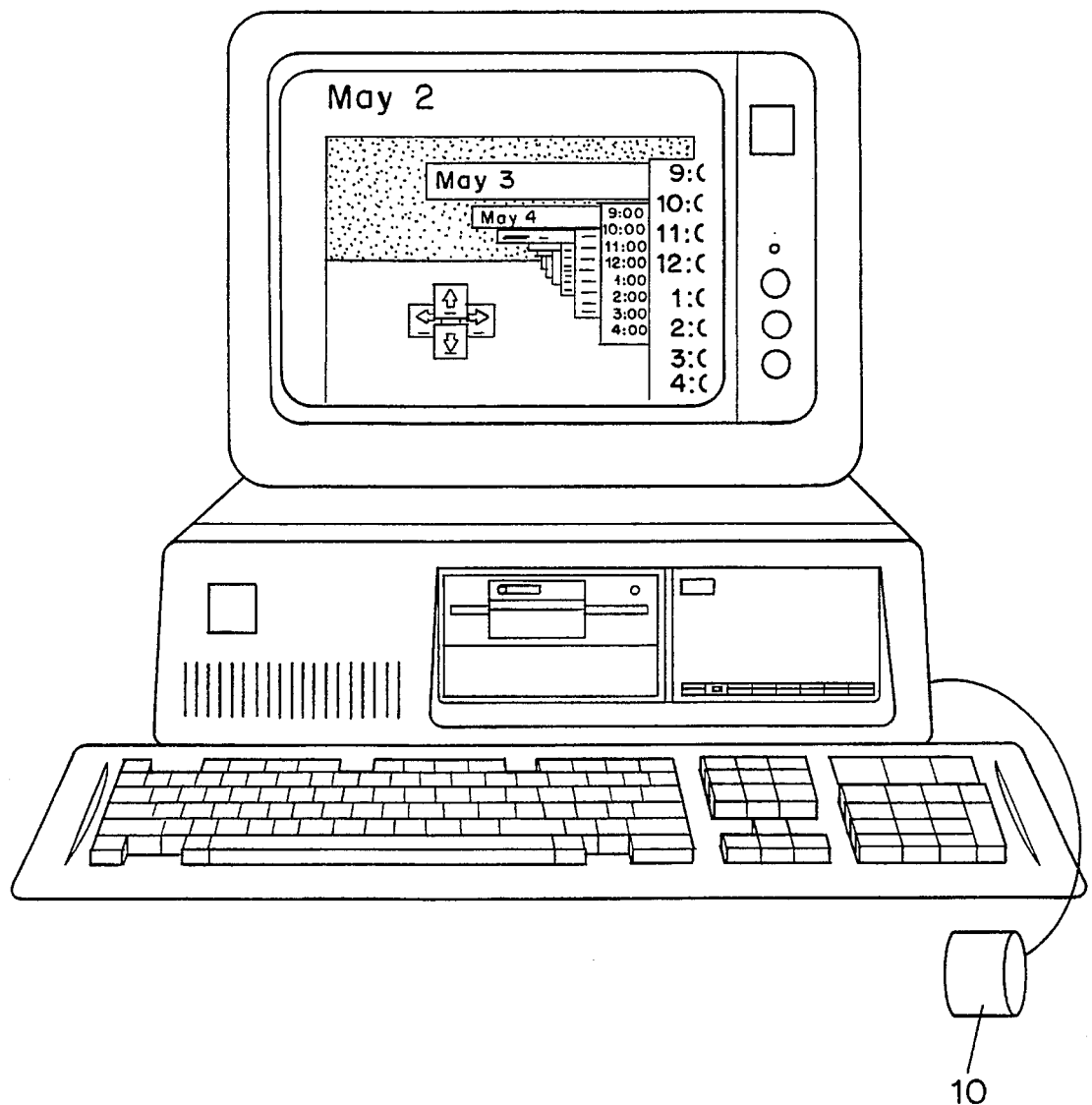
FIG. 3 schematically illustrates a computer utilizing an embodiment of the graphical user interface of the present invention.
Figure 4:
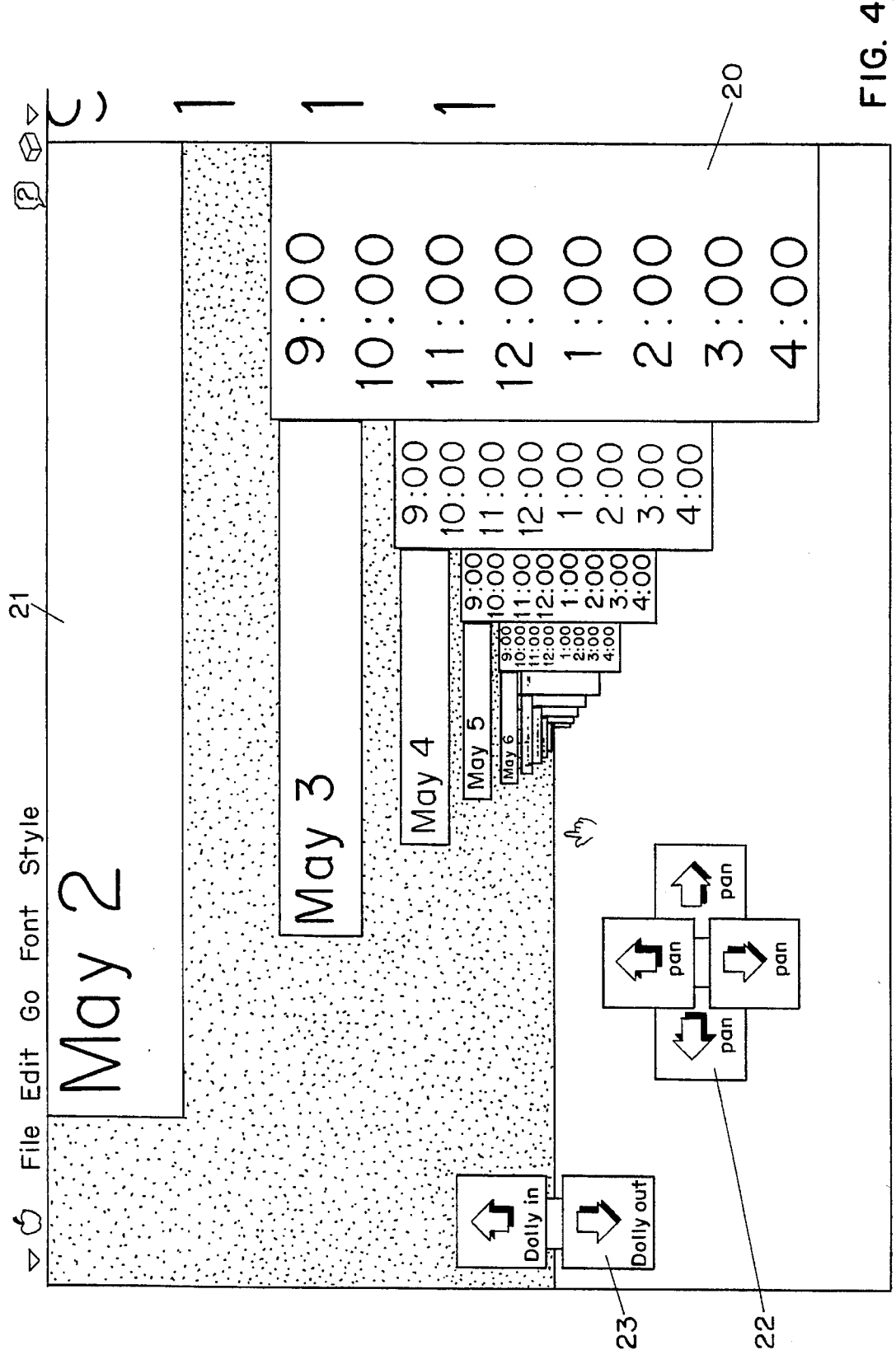
FIG. 4 illustrates the embodiment of the graphical user interface of FIG. 3.

FIG. 3 schematically illustrates a computer system utilizing an embodiment of the graphical user interface of the present invention. FIG. 4 illustrates in more detail the graphical user interface of FIG. 3. In the graphical user interface, many information surfaces 20 are placed in a perspective row arrangement. In addition, as shown in FIGS. 3 and 4, the surfaces 20 have a masthead 21. This masthead 21 provides information as to the content of the surface. Thus, for example, if the surfaces contain information as to appointments, the masthead would show the date of each surface. If the surfaces contain abstracts of published articles, the masthead could show the title of the articles, etc. This enables a user to quickly decide whether or not she should look at the contents of the information surface.

In order to access a surface, e.g., the May 5 surface in FIG. 4, the user would click on the appropriate directional button or just move the mouse 10. The surfaces would then move "forward" until the desired surface is reached. This creates the effect of "text-coming-at-you" which beneficially allows a large number of text panels, perhaps an entire database to be simultaneously shown on a display screen. An inherent benefit is that a user is able to maintain a strong awareness of his or her location within the database, thereby enhancing search efficiency.

Figure 5:
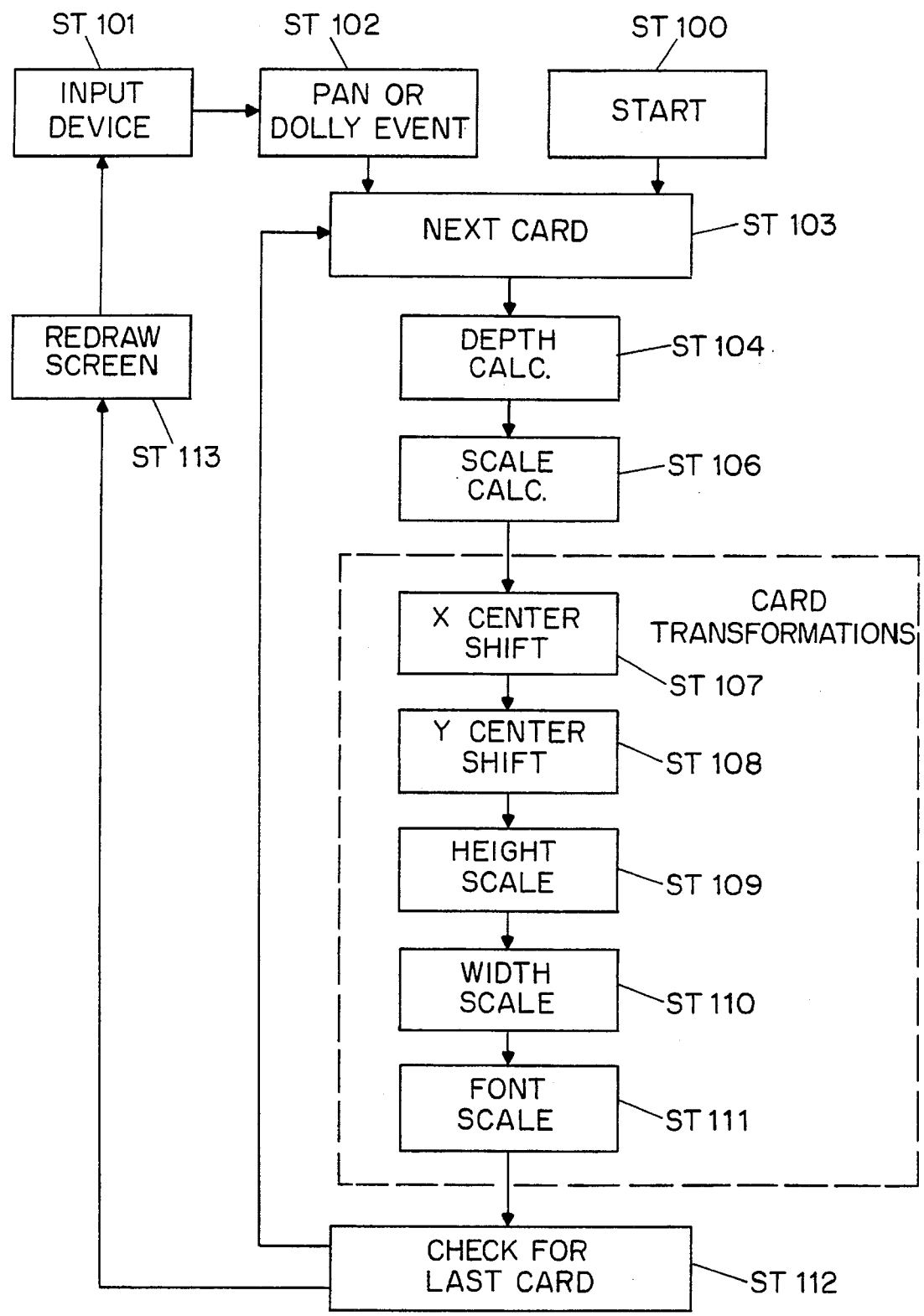
FIG. 5 is a flow chart illustrating the process flow of the graphical user interface of the present invention.
Figure 6:
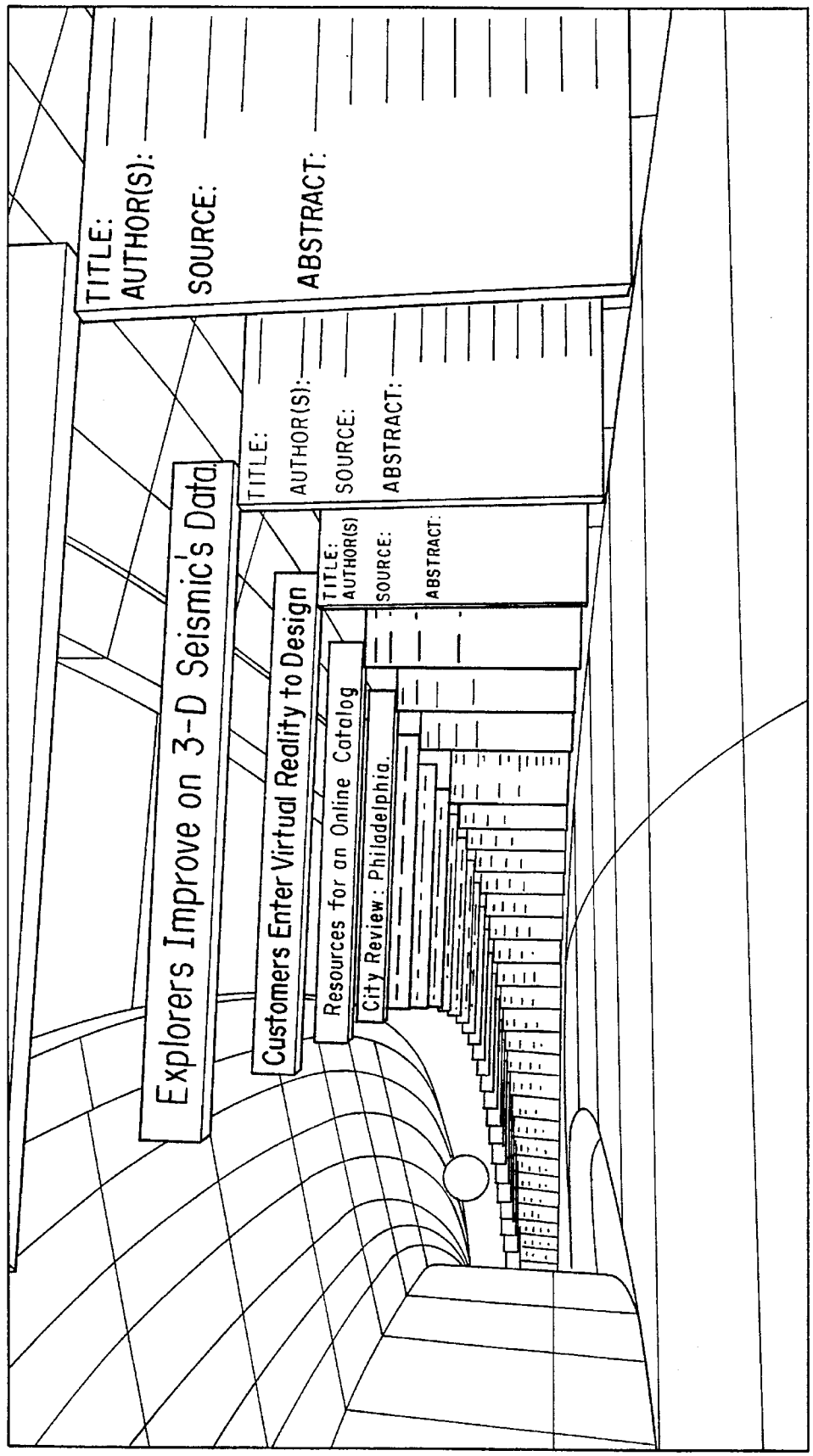
FIG. 6 illustrates a second embodiment of the graphical user interface of the present invention.

To form and maintain such graphical user interface, the computer would initialize and load the graphical user interface program, as well as all the data needed for the information surfaces. In this Step 100 (shown in FIG. 5 as ST 100), the computer would perform all the necessary operations to bring into memory the graphical user interface program.

In the loop formed by Steps 103 to 112, the computer would examine the first surface (ST 103) and calculate the depth and scale (size) of the surface based on its position on the row (ST 103 and 104). The equation used for scaling the surface is a 4th order polynomial of the form:

Scaling Factor=$ax^4+bx^3+cx^2+dx+e$ where x is the depth, or distance, of a given surface from the viewer. The coefficient "a" may be zero or close to zero. To simulate perspectival dollying that is close to real, the following coefficients have been used:

| a = 0.000001 | b = 0.002 | c = −0.0112 |
| d = 0.773 | e = 0 | |

The information surface is then transformed by a series of X-center (ST 107), Y-center (ST 108), height (ST 109), width (ST 110), and font-scale calculations (ST 111). In this manner, the position, height, and width of the surface, as well as the size of the font on the surface are calculated.

Once all calculations are made, the computer checks whether the surface is the last surface to be calculated (ST 112). If it is not the last surface, the process starts again for the next surface (ST 103).

Once all the parameters for every surface are calculated, the screen is drawn (ST 113). The computer then waits for an input from the input device (ST 101).

Accordingly, the user is presented with a three-dimensional view of information surfaces receding in perspective, as seen in FIG. 4. Navigational buttons are also provided for the manipulation of the user interface. These are divided in two groups, i.e., the PAN buttons 22 and the DOLLY buttons 23. Using the input device, the user clicks on the appropriate button to indicate the desire to move forward or back (DOLLY), or to shift up, down, left or right (PAN) (ST 102).

Upon the occurrence of a PAN or DOLLY event, the calculation process begins again. Accordingly, depth and scale factors are calculated. The information surfaces are then transformed by a series of X-center, Y-center, height, width, and font-scale calculations. Upon reaching the last surface, the screen is then redrawn.

Because of its simplicity, the interface can be utilized on any standard computer screen to display text and graphics which are completely legible at all phases of operation. Thus, the program can be implemented on a Macintosh with a HyperSurface program, a computer with a Open GL program, or any other computer with windows capabilities.

Any kind of directional input means may also be utilized to transmit pan and dolly control signals to the system interface, thereby enabling the user to rapidly browse through large amounts of information while retaining a sense of location within the file. The directional input means may be a mouse, a light pen, a touch sensitive screen, a keyboard, a track-ball, a touch pad, voice activated control, etc. Additionally, the pan and dollying control signals may based on the movement of these input means, i.e., moving a mouse in a certain direction, as opposed to having to click on the PAN button 22 of FIG. 4.

Possible applications include dynamic "three-dimensional" address and telephone books, library surface catalogs, encyclopedias, and any other systems that currently uses a line interface or a "desktop metaphor" windowing system, such as file and directory structures of computer hard drives or database systems. For example, currently a telephone operator must type in a name in order to receive a telephone listing. With a graphical user interface as described herein, if a person would like the telephone number of Joe Smith, the telephone operator would dolly up to the "S" masthead, then to a secondary "Smith" masthead, and ultimately to "Smith, Joe." Then the operator would look at the information on the surface.

Accordingly, the addition of the third dimension is particularly helpful because using the 3D spatial metaphor engages the user's spatial thinking more heavily which allows for enhanced retention of record content and location. In addition, utilization of a directional input means, such as a mouse or a trackball, reduces the need for entering keyboard commands to control the review of text, thereby benefitting individuals which physical handicaps, and reducing injuries resulting from repetitive keystrokes.

The information surfaces in the graphical user interface of the present invention can also be expanded in size. This would benefit the visually impaired because the user can enlarge any text panel at will.

It will be understood that the invention is not limited to the embodiments described and illustrated herein as they have been given only as examples of the invention. Without going beyond the scope of the invention, certain arrangements may be changed or certain means may be replaced by equivalent means. For example, the information surfaces can be visible cards or transparent surfaces where the text appears to "float." In addition, these surfaces may be curved, flat, etc.

We claim:

1. A display system comprising a two-dimensional graphical display device, processor means operationally coupled to the display device for forming a display of a plurality of one-dimensionally ordered planar display surfaces on the display device, and input means operationally coupled to the processor means for controlling the display, wherein the processor means is instructed:

for forming the display such that the display surfaces appear in a corridor perspective in their one-dimensional order, wherein each display surface has at least one extended masthead within the plane;

for receiving dollying control input from the input means; and for changing the display in response to the dollying control input so as to produce a display effect which gives a viewer of the display a perception of dollying along the corridor perspective.

2. The display system of claim 1, wherein the processor means is further instructed:

for receiving panning control input from the input means; and for changing the display in response to the panning control input so as to produce a display effect which gives the viewer a perception of panning within one of the display surfaces.

3. The display system of claim 1, wherein said input means is one of a mouse, a light pen, a touch-sensitive screen, a keyboard, a track ball, a touch pad, and voice-activated control.

4. The display system of claim 1, wherein the perspective is a one-point perspective.

5. The display system of claim 1, wherein the perspective is a multiple-point perspective.

6. The display system of claim 1, wherein the processor means is further instructed for changing a displayed surface as to scale.

7. The display system of claim 1, implemented on one of a Macintosh and a PC.

8. A computerized method for displaying a plurality of one-dimensionally ordered planar display surfaces on a two-dimensional graphical display device, comprising:

forming a display on the display device such that the display surfaces appear in a corridor perspective in their one-dimensional order, wherein each display surface has at least one extended masthead within the plane;

receiving dollying control input from an input means; and changing the display in response to the dollying control input so as to produce a display effect which gives a viewer of the display a perception of dollying along the corridor perspective.

9. The method of claim 8, further comprising:

receiving panning control input from the input means; and changing the display in response to the panning control input so as to produce a display effect which gives the viewer a perception of panning within one of the display surfaces.

10. The method of claim 8, wherein said input means is one of a mouse, a light pen, a touch-sensitive screen, a keyboard, a track ball, a touch pad, and voice-activated control.

11. The method of claim 8, wherein the perspective is a one-point perspective.

12. The method of claim 8, wherein the perspective is a multiple-point perspective.

13. The method of claim 8, further comprising changing a displayed surface as to scale.

14. The method of claim 8, carried out by one of a Macintosh and a PC.

* * * * *